United States Patent [19]

Speeter

[11] Patent Number: 5,479,528
[45] Date of Patent: Dec. 26, 1995

[54] INTELLIGENT WORK SURFACES

[75] Inventor: Thomas H. Speeter, Freehold, N.J.

[73] Assignee: AT&T Corp., Murray Hill, N.J.

[21] Appl. No.: 279,458

[22] Filed: Jul. 22, 1994

Related U.S. Application Data

[60] Continuation of Ser. No. 71,433, Jun. 2, 1993, abandoned, which is a division of Ser. No. 807,524, Dec. 13, 1991, abandoned.

[51] Int. Cl.$^6$ .................................................. G06K 9/00
[52] U.S. Cl. .................. 382/115; 73/862.046; 73/862.53
[58] Field of Search ............................ 382/2, 1, 58, 115, 382/123, 124, 312; 73/862.046, 862.53; 356/376; 364/561, 413

[56] References Cited

U.S. PATENT DOCUMENTS

| | | | |
|---|---|---|---|
| 4,107,775 | 8/1978 | Ott | 382/2 |
| 4,206,441 | 6/1980 | Kondo | 382/2 |
| 4,236,082 | 11/1980 | Butler | 382/2 |
| 4,481,815 | 11/1984 | Overton | 73/432 R |
| 4,526,043 | 7/1985 | Boie et al. | 73/762.04 |
| 4,573,193 | 2/1986 | Skuto et al. | 382/2 |
| 4,640,137 | 2/1987 | Trull et al. | 73/862.04 |
| 4,855,923 | 8/1989 | Fullmer | 73/862.53 |
| 4,857,916 | 8/1989 | Bellin | 382/2 |
| 5,025,476 | 6/1991 | Gould et al. | 382/2 |

OTHER PUBLICATIONS

J. Nilsson et al., "Ground Reaction Forces at Different Speeds of Human Walking and Running," Acta Physiol Scand., vol. 136, 1989, pp. 217–227.
W. Herzog et al., "Asymmetries In Ground Reaction ...", Medicine And Science In Sports And Exercise, vol. 21, No. 1, 1989, pp. 110–114.
G. C. Santambrogio, "Procedure for Quantitative Comparison ...," IEEE Trans. on Biomedical Engineering, vol. 36, No. 2, Feb. 1989, pp. 247–255.
T. H. Speeter, "Flexible, Piezoresitive Touch Sensing Array," SPIE vol. 1005, 1988, pp. 31–43.
T. H. Speeter, "A Tactile Sensing System for Robotic Manipulation," The Int'l Jour. of Robotic Research, vol. 9, No. 6, Dec. 1990, pp. 25–36.
T. H. Speeter, "Analysis and Control of Robotic Manipulation," Dept. of Biomedical Engineering, Case Western Reserve University, Jan. 1987, pp. 193–197.
M. Lord et al., "Foot Pressure Measurement: A Review ...", Jour. Biomed. Eng., vol. 8, Oct. 1986, pp. 283–294.
T. Duckworth et al., "The Measurement of Pressures under the Foot," Foot & Ankle, vol. 3, No.3, 1982, pp. 130–141.

Primary Examiner—Yon J. Couso
Attorney, Agent, or Firm—Gerard A. deBlasi

[57] ABSTRACT

Methods and apparatus for implementing intelligent work surfaces are provided. Work surfaces, such as desktops and floors, are covered with a tactile sensing array to provide tactile data to a processor. Regions on the sensing arrays may be defined to include predetermined sensing elements of the sensing array and may be specified to function as input devices, such as a keyboard, a mouse, or the like. Once defined, regions may be redefined to reposition a specified input device. Regions also may be respecified to function as a different input device. The arrays also may collect data at predetermined intervals for analysis, such as for identifying an individual or an object. For example, the force-image of an individual's handprint or footprint could be taken, analyzed, and compared against data representing the force-images of known individuals.

4 Claims, 12 Drawing Sheets

INTELLIGENT WORK SURFACES

This application is a continuation of application Ser. No. 08/071,433, filed on Jun. 2, 1993, now abandoned, which is a division of application Ser. No. 07/807,524 filed Dec. 13, 1991, now abandoned.

FIELD OF THE INVENTION

The present invention relates to tactile sensor arrays and, more particularly, to methods for using tactile sensor arrays to implement work surfaces.

BACKGROUND OF THE INVENTION

Many offices and laboratories are equipped with computer and telecommunications systems. These systems require a variety of input devices, such as keyboards, mice, telephones, and facsimile machines, which occupy and clutter valuable workspace. The various input devices are not as convenient as they could be. For example, it often is difficult to rearrange input devices on a work surface. Many input devices, such as the keyboard and mice described above, are connected to a computer system by cables and therefore are restricted in position. It also may be difficult or inconvenient to move or reorient such devices to accommodate different computer users or changing space requirements.

One prior art technique for consolidating input devices was to provide an array that performed different functions at different times. For example, a computer keyboard typically includes an array of keys that may be defined as a numeric keypad at one time and may be defined as cursor control keys at another time. However, such input devices do not permit the array itself to be reconfigured to provide an entirely different function, such as a mouse. Also, the input device could not be reconfigured to change the position or orientation of the array on the device.

Other desirable functions such as inexpensive, simple, and reliable security for an unsecured office or laboratory are unavailable. One possible example of a need for such security would be the ability to monitor the presence of objects on a laboratory surface. For example, it may be important to know whether chemicals or experiments in a laboratory have been touched, moved, or otherwise tampered. Similarly, it may be important to know whether objects in an office were touched or moved.

Security measures limiting access to secured areas or to computer systems also may be improved. Security measures such as combination locks and computer passwords may not provide the level of security desired. For example, it may be desirable to replace or augment combination locks and passwords with other security measures that are not easily circumvented such as by discovery by unauthorized personnel.

SUMMARY OF THE INVENTION

Tactile sensing arrays may be configured and monitored to create "intelligent" work surfaces having the versatility and adaptability to be configured to receive information and to implement various input and telecommunications devices. Intelligent work surfaces can be reconfigured at will to implement different devices. Moreover, these surfaces can be reconfigured to change the location and orientation of the devices.

Intelligent work surfaces can be implemented as intelligent desktops, floors, walls, or other such surfaces. In a preferred embodiment, the intelligent surface is a desktop surface capable of implementing input and telecommunications devices such as a keyboard, numeric keypad, mouse, and the like. An intelligent desktop also can monitor the presence and location of items on the desktop. Inputs to the intelligent surface produce outputs from the tactile array which are interpreted as outputs from the implemented device. Devices implemented on the intelligent desktop surface preferably are implemented as templates, and therefore do not occupy and clutter valuable workspace. Implemented devices may be arranged and rearranged on the work surface to suit different users and changing workspace requirements. There are no computer cables to tangle or to restrict device placement.

In another embodiment, intelligent work surfaces are implemented as floor surfaces. Intelligent floors are capable of detecting the presence and tracking the location of objects and people on the surface. In still other embodiments, the surface is configured to produce a two-dimensional image of the forces applied to the surface (a "force-image") for identifying a person. For example, the force-image of a person's handprint can be sampled, analyzed, and compared against data representing the force-images of known individuals to identify the person creating the handprint.

BRIEF DESCRIPTION OF THE DRAWINGS

The above and other advantages of the invention will be apparent upon consideration of the following detailed description taken in conjunction with the accompanying drawings in which like reference numbers refer to like parts throughout and in which.

DETAILED DESCRIPTION

Tactile sensing arrays may be configured and monitored to create "intelligent" work surfaces to implement various input and telecommunications devices, such as a keyboard, a numeric keypad, a mouse, or the like. Inputs to the intelligent surface produce outputs from the tactile array which are interpreted by a processor as outputs from the implemented device. For example, force applied to the tactile array produces an electrical signal at the outputs of the array. The processor then interprets the electrical signal as a keystroke output from a keyboard. When a particular device is no longer needed or when a new device is desired, the intelligent work surface is reconfigured to implement different devices. For example, the intelligent work surface can be reconfigured such that outputs from the tactile array in the example above are interpreted as outputs from a mouse to a display screen instead of keystrokes from a keyboard.

Implemented devices may be arranged and rearranged on the work surface to suit different users and changing workspace requirements. For example, a keyboard is configured at a first location by a first computer user. The location of the keyboard is shifted, for example, to the left to accommodate the preferences of a subsequent computer user.

Figure 1:
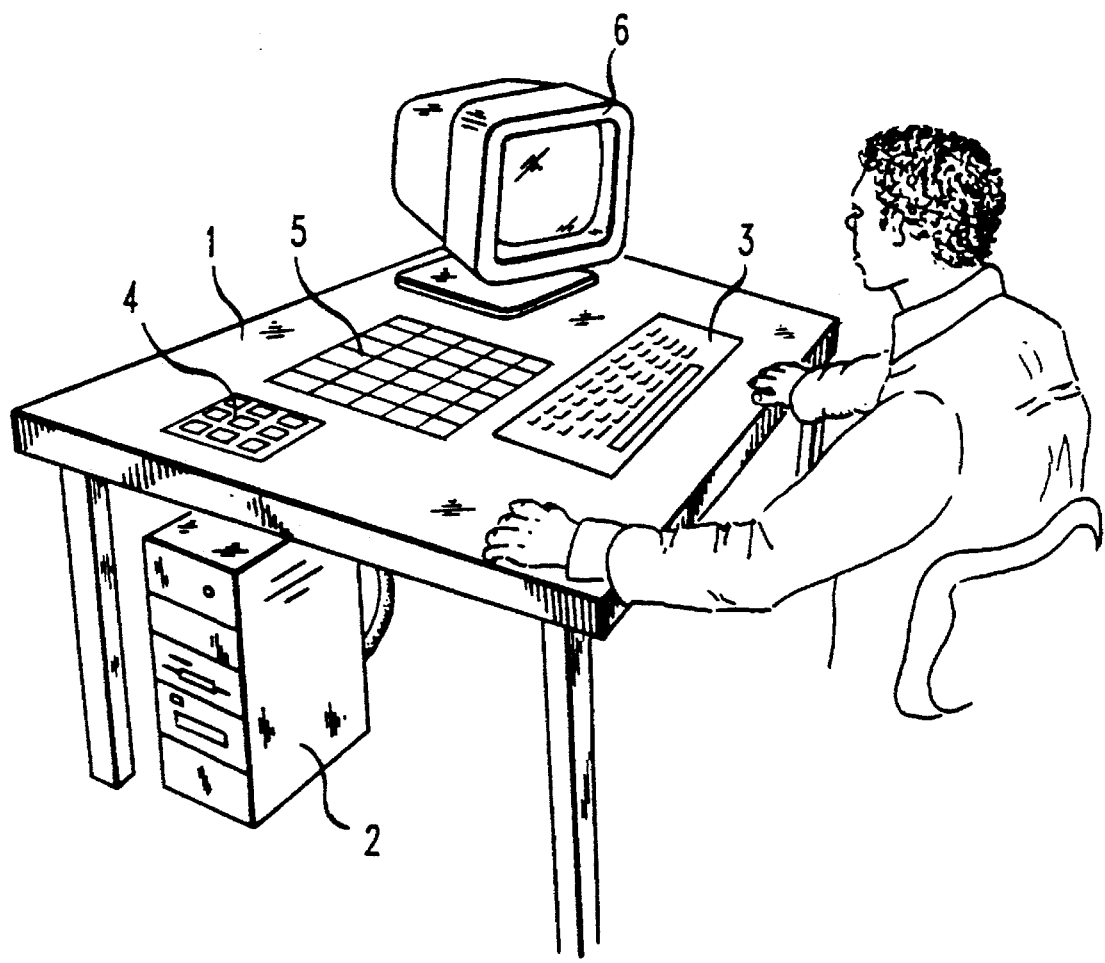
FIGS. 1 and 2 are perspective views of a desktop surface covered with sensing arrays configured as an intelligent work surface in accordance with the principles of the invention.

FIG. 1 shows a desk entirely covered with a tactile array surface 1 and a processor 2. FIG. 1 also shows a keyboard 3, a numeric keypad 4, an input interface 5, and a display screen 6. Tactile array 1 is coupled to processor 2 to form the intelligent work surface system. Tactile array 1 outputs to the processor information about inputs applied to the array. Groups of sensing elements (see FIG. 3) which make up the tactile array are configured as an input interface to implement various devices. For example, groups of sensing elements of tactile array 1 are configured as a keyboard interface 3. As used herein, the term "region" refers collectively to a group of sensing elements on array 1. In a typical application, force applied to predetermined sensing elements within the region of the tactile array configured as keyboard 3 will generate signals indicative of keystrokes. Similarly, other groups of sensing elements of tactile array 1 are defined, for example, to be numeric keypad 4 or to be input interface 5 for display screen 6.

Figure 2:
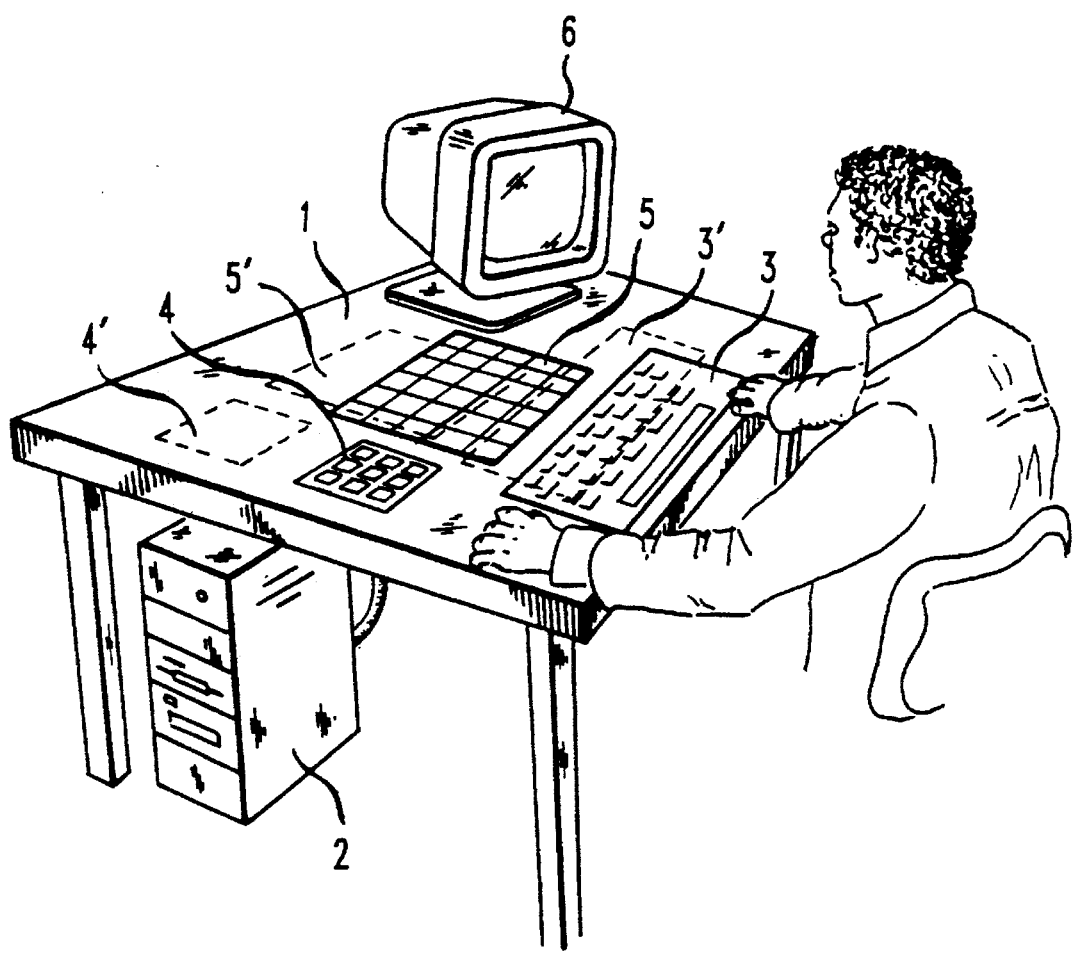

Input interfaces or devices implemented on tactile array 1 can be reconfigured at will to change the location, size, or orientation of the devices. Also, new devices may be configured on the tactile array and existing devices may be removed. For example, FIG. 2 shows keyboard 3, keypad 4, and display input interface 5 reconfigured to have a new location on tactile array 1. Reference numbers 3', 4', and 5' indicate the prior location (shown in phantom) corresponding to the position shown in FIG. 1, of each device. The groups of sensing elements identified by 3', 4', and 5' have been reset to their original state (which typically may be undefined). The portion of the tactile array having sensing elements 3' which overlaps with keyboard 3 is redefined to perform the appropriate functions for keyboard 3.

Figure 3:
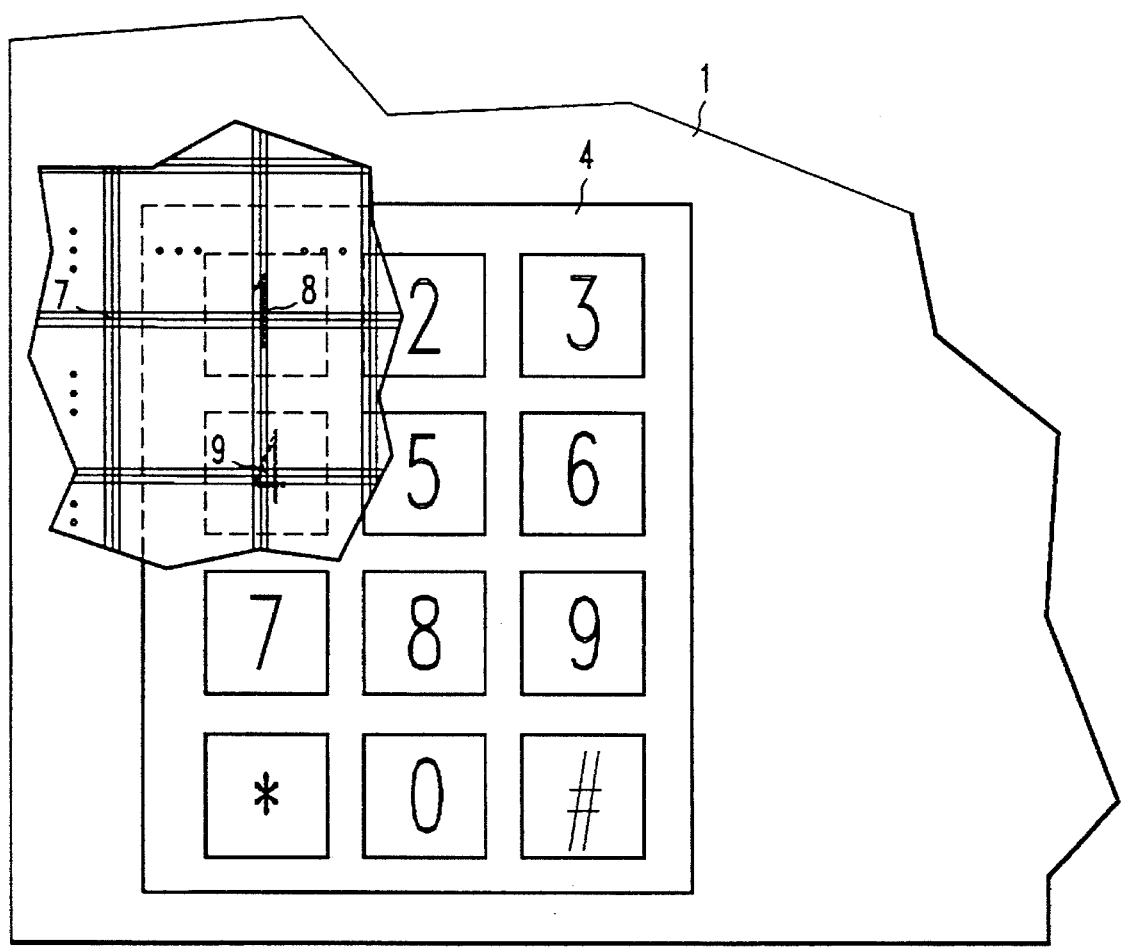
FIG. 3 is a simplified, partial exploded view of the intelligent work surface of FIG. 2.

FIG. 3 shows the sensing elements 7 which form tactile array 1. Sensing elements 7 are formed by the intersection of rows and columns of electrical conductors. Inputs (i.e., forces) applied to tactile array 1 cause the row and column conductors to contact. Contact of the conductors permits electrical current to flow, thus generating an output from the sensing element located at the intersection of the row and column conductors.

As shown in FIG. 3, region of tactile array 1 defined by processor 2 as numeric keypad 4 overlays selected ones of sensing elements 7. Processor 2 performs a "template" function by defining a group of sensing elements as an input device, in this case, the numeric keypad. Processor 2 also performs a "mapping" function to interpret the outputs of the sensing elements as outputs of the defined input device. For example, keys "1" and "4" of keypad 4 overlay the groups of sensing elements which are designated collectively by reference numbers 8 and 9, respectively. Processor 2 will interpret outputs from sensing elements 8 and 9 (resulting from force applied to those elements) as outputs of keypad 4.

Numeric keypad 4 may be repositioned by changing in processor 2 the definition of the region on tactile array 1 which corresponds to the keypad. Redefining the region is accomplished in this example by specifying different ones of sensing elements 7 to function as the keys of keypad 4. For example, keypad 4 may be redefined by processor 2 such that key "1" of the keypad overlays the group of sensing elements designated by reference number 9 (i.e., instead of the sensing elements designated by reference number 8, as shown in FIG. 3). Keypad 4 is shifted downward so that key "1" occupies the location formerly occupied by key "4," key "2" occupies the location formerly occupied by key "5," etc. As redefined, processor 2 will interpret the outputs of sensing elements 9 as an output "1" from keypad 4, instead of the output "4" as originally defined.

Figure 4:
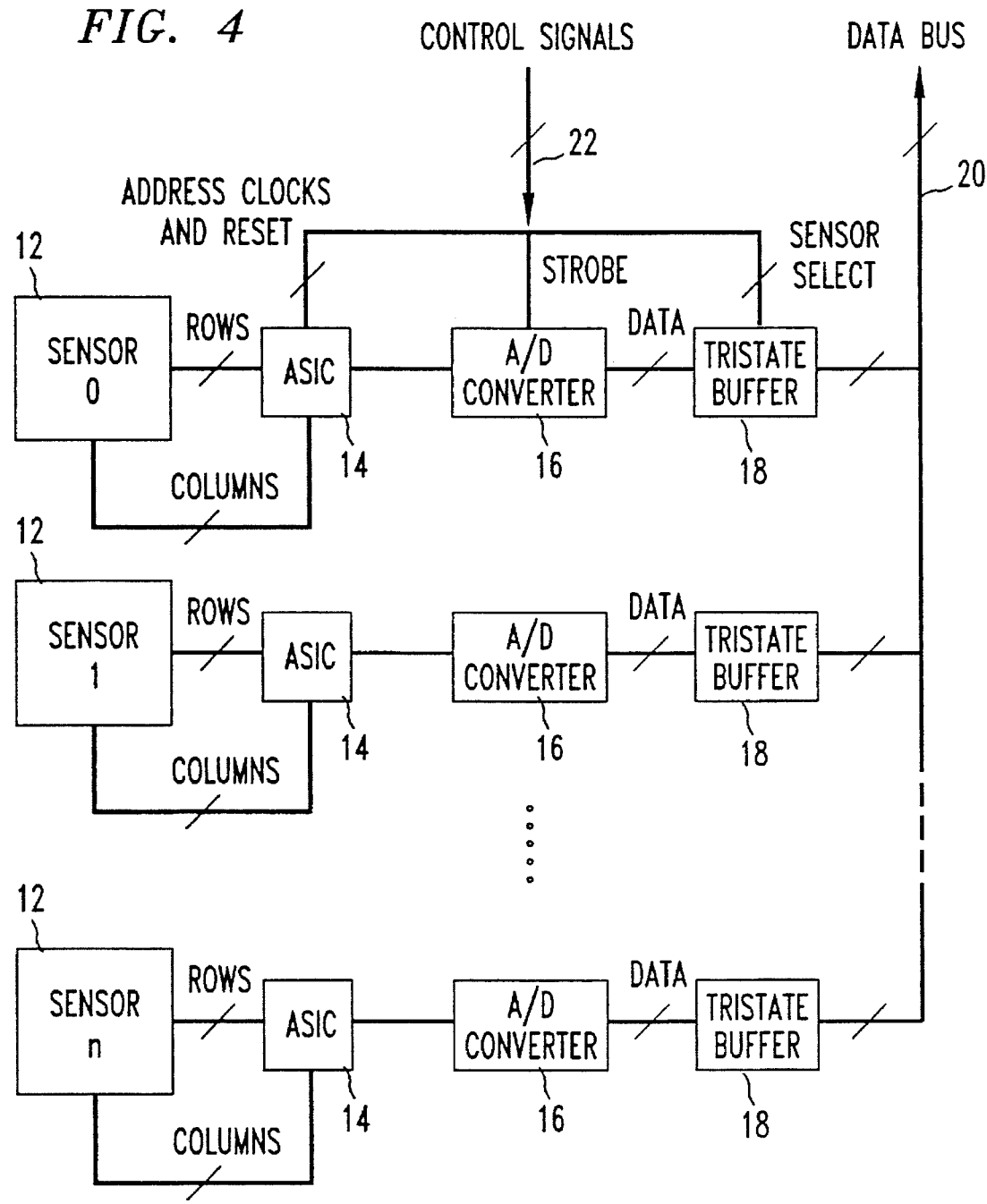
FIG. 4 is a block diagram of circuitry for implementing intelligent work surfaces according to the principles of the present invention.

FIG. 4 shows several tactile sensor arrays 12 connected in parallel, which may be used to implement an intelligent work surface (i.e., tactile array 1 of FIG. 1) or a plurality of such work surfaces. Addressing circuitry 14 is associated with each sensor array 12, for addressing the individual sensing elements (also referred to as "pixels" or "taxels") which form each array 12. Circuit 14 is shown as an application specific integrated circuit or "ASIC." Analog to digital (A/D) conversion circuitry 16 (having sample and hold capability) receives data outputs passing through addressing circuitry 14 from array 12. After a predetermined settling period (determined by the array characteristics), data pass from the A/D converter to a data bus 20 via an addressable tri-state buffer 18. Data bus 20 couples to an appropriate processor such as processor 2 in FIGS. 1 and 2 for processing data in accordance with the principles of the invention. Implementation details of the illustrative sensor array circuitry of FIG. 4 will be discussed further following a discussion of illustrative techniques for implementing intelligent work surfaces.

Figure 5:
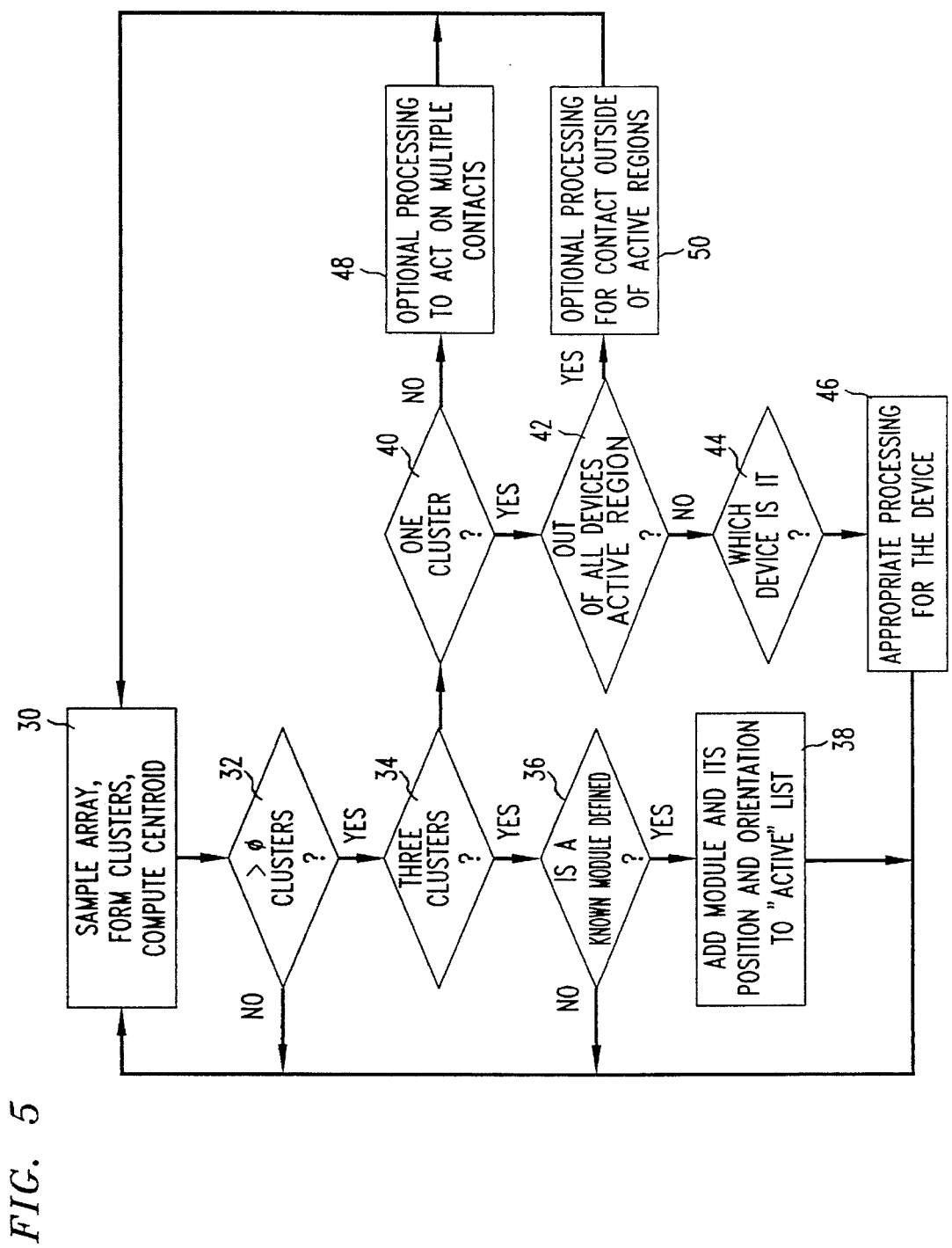
FIG. 5 is a flowchart for implementing a keyboard-type interface on an intelligent desktop surface.
Figure 6:
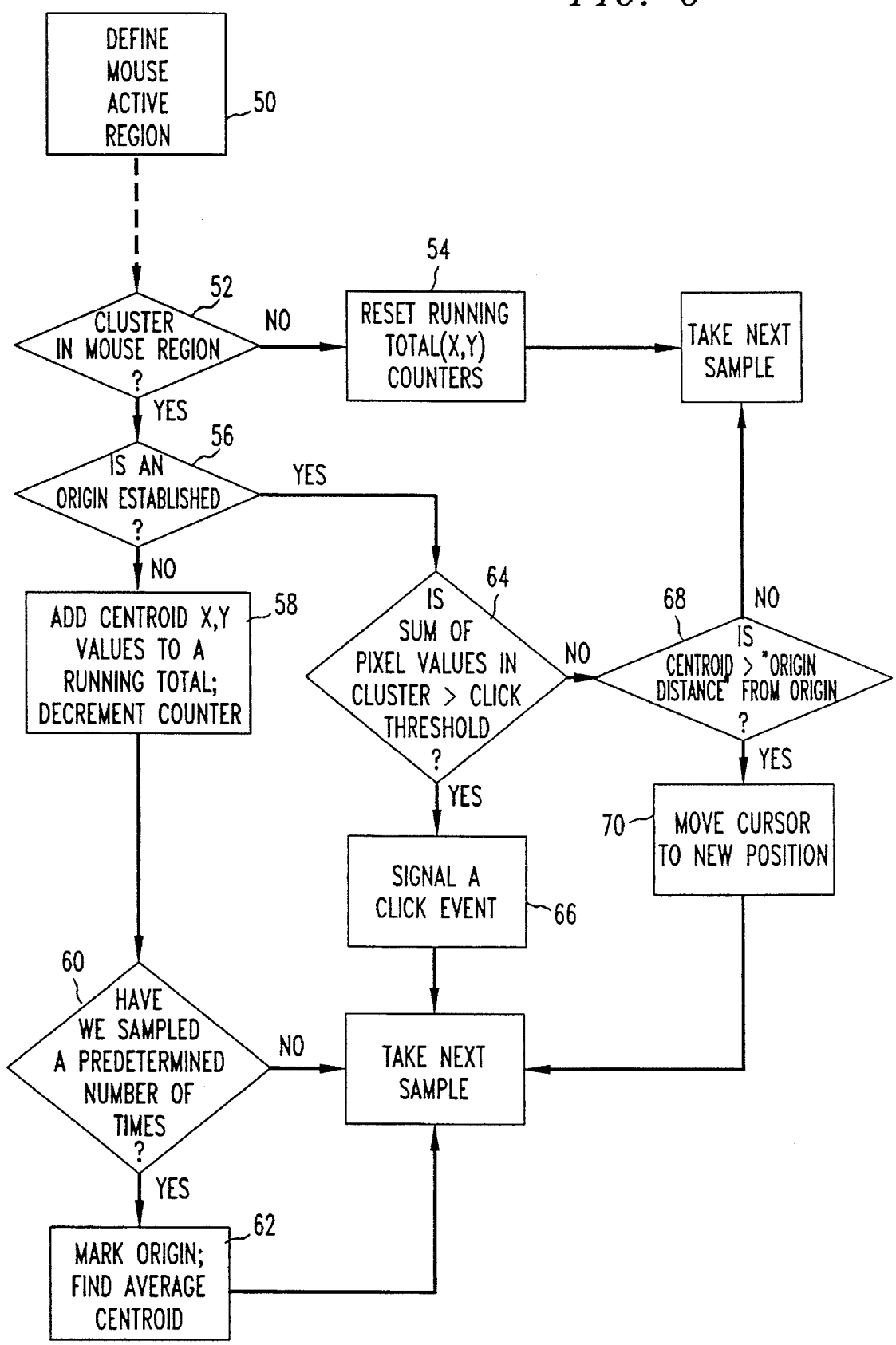
FIG. 6 is a flowchart for implementing a mouse-type interface on an intelligent desktop surface.
Figure 7:
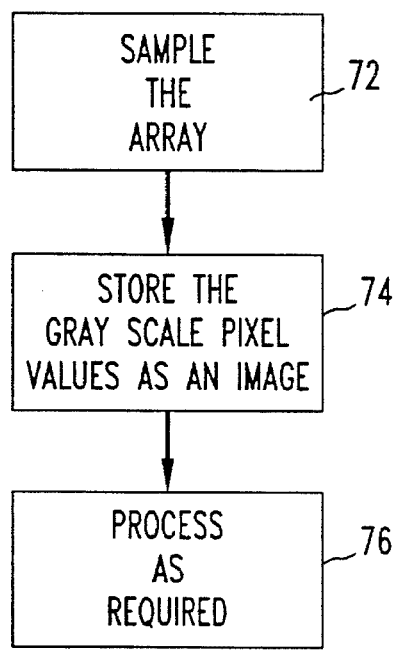
FIG. 7 is a flowchart for implementing an image-type interface on an intelligent desktop surface.
Figure 11:
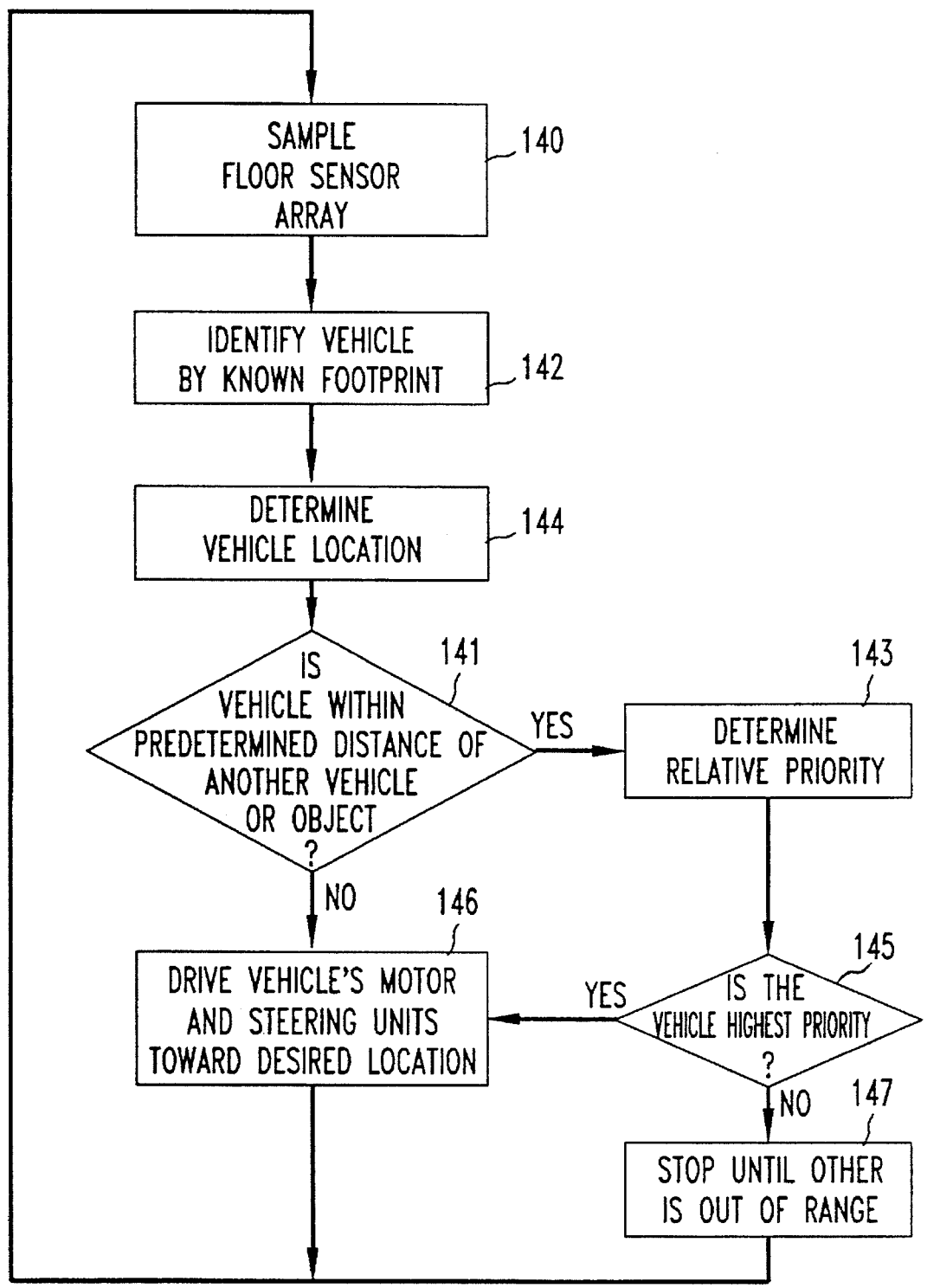
FIG. 11 is a flowchart for controlling a mobile vehicle using an intelligent floor surface.
Figure 12:
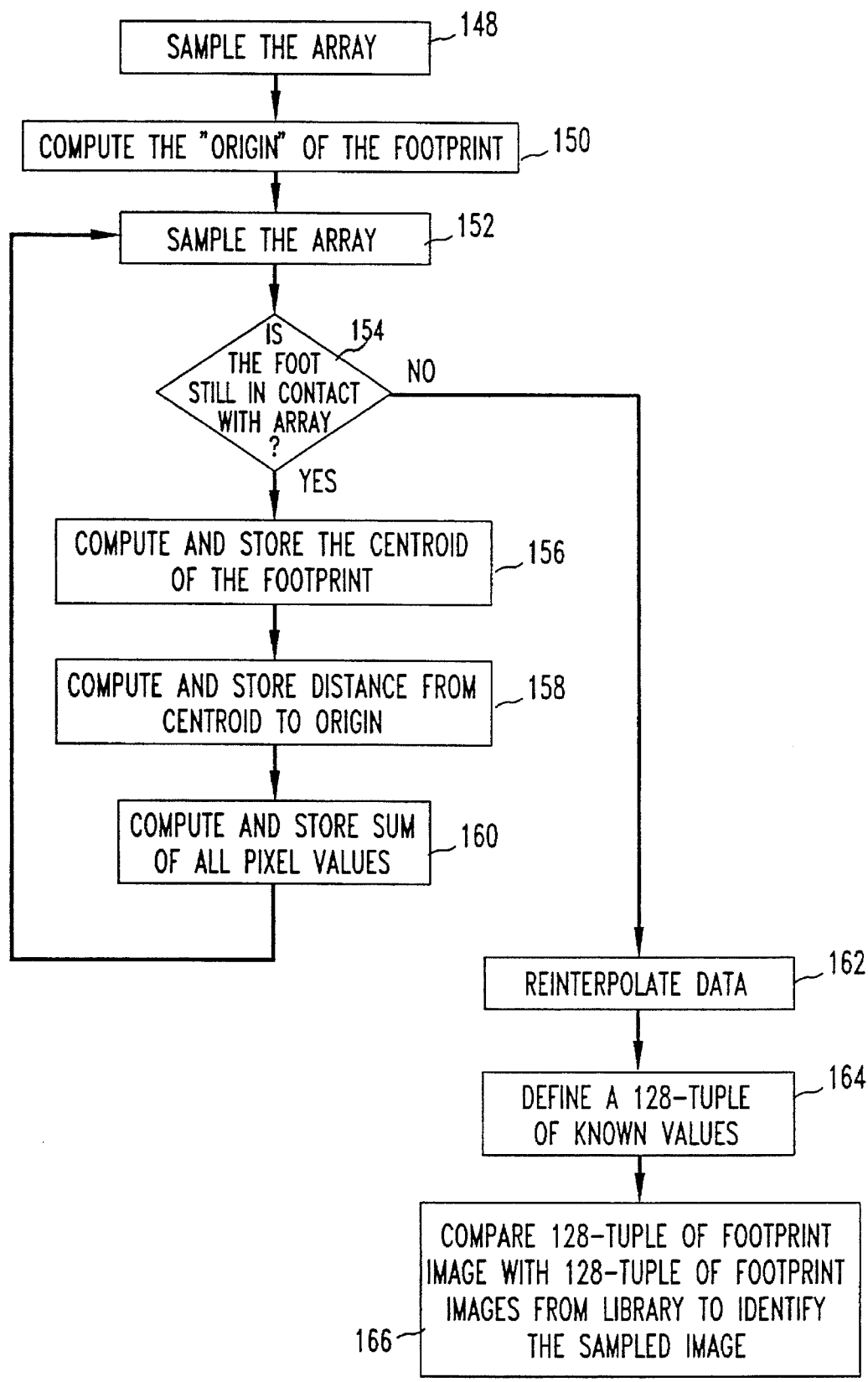
FIG. 12 is a flowchart for using an intelligent floor surface to identify an individual using footprint analysis.

FIGS. 5–7 flowchart illustrative methods for implementing various desktop applications in processor 2. FIGS. 11 and 12 flowchart illustrative methods for implementing various intelligent floor applications in a processor such as processor 2.

Before describing the various applications in detail, two image processing techniques common to most of the applications will be described. These techniques are "connected region analysis" (or "clustering") and determining the centroid of an image. Clustering involves grouping sampled pixels of array 12 into connected regions. Clustering techniques are well-known in the art of image processing, and are described in T. Pavlides, *Algorithms for Graphics and Image Processing,* Comp. Science Press, 1982. The centroid of each clustered region may be determined for an n×m sensor array using the formulas:

$$\bar{x} = \frac{1}{nm} \sum_{i=1}^{n} \sum_{j=1}^{m} i * V_{ij}$$

$$\bar{y} = \frac{1}{nm} \sum_{i=1}^{n} \sum_{j=1}^{m} j * V_{ij}$$

where n and m are the numbers of rows and columns in the sensor array, respectively, i and j are the row and column displacement, respectively, and V is the gray scale value of the pixel at coordinates (i,j).

In a desktop application, data typically will be input to a processor through one of three types of interfaces: a "keyboard" interface, a "mouse" interface, or an "image" interface. Portions of the desktop surface can be defined, through an initialization procedure, to be input devices of one of these types of interfaces. The processor defines input devices by the template and mapping functions described above. That is, the processor first identifies selected sensing elements as an input device. The processor then interprets (maps) the outputs of the selected sensing elements to be outputs of the input device. The processor may define several input devices simultaneously, on different portions of the desktop.

Referring again to the figures, the flowchart of FIG. 5 shows an illustrative method for implementing a keyboard interface. The keyboard interface may be used to provide keyboards (such as keyboard 3 of FIG. 1), numeric keypads, and other similar devices. (These devices may be constructed, for example, by overlaying a sheet of compliant material with a patterned template.) As will be described more fully below, the process illustrated by FIG. 5 also is used to define other, non-keyboard devices.

As shown in box 30, a processor (such as processor 2 of FIG. 1) samples sensor array 12. This may be done, for example, by cycling through the array to address each sensing element. Sampled points then are "clustered" into connected regions, and the processor computes the centroid of each region. Once the data is collected from the array, the processor performs one of three general operations. The processor either defines a device, performs a processing operation for a device already defined, or performs an "optional" or special processing operation upon the occurrence of some predetermined event (e.g., contact to tactile array 1 outside of any defined region).

Boxes 32, 34, 36, and 38 show how a module (i.e., a defined area on the sensor array or a device such as a keyboard or mouse) may be added to a list of "active" devices. The array is sampled until at least one cluster is detected. Upon detecting a cluster, the processor determines whether there are three clusters. If three clusters are detected, the processor determines whether the pattern formed by the centroids of the three clusters correspond to the "footprint" of a known module. If so, the module and its position and orientation are added to a list of active devices. If the centroids do not correspond to the footprint of a known module, the inputs may be ignored, and the array is sampled again.

Once a device is active, the processor monitors arrays to determine, for example, whether a key is struck in the active region. If the response to decision box 34 is "no" (i.e., the number of clusters does not equal three), the processor determines whether there is only one cluster (box 40) and to which active device this cluster belongs (box 44). Because each device is divided into non-overlapping regions, the centroid of a single cluster will reside in one region identifying, for example, the "key" of the keyboard that was pushed. Device-specific software running on processor 2 then interprets the outputs of the tactile array as outputs of the defined input device and executes functions on the basis of the detected keystrokes (box 46).

If the decision at box 40 is "no," (i.e., there is more than one cluster) the processor preferably performs additional processing to act on multiple contacts to the sensor array (box 48). This provides a means for allowing module-independent functions, such as system on/off, last entry erasure, session termination or restart, or region definition for other module types (e.g., a muse). Similarly, if the answer to decision box to 42 is "yes," the processor preferably performs additional processing (e.g., erasing previous key strokes of a calculation by striking outside an active calculator area) for contacts outside the active region of any known module (box 50).

An illustrative flowchart for implementing on tactile array 1 a second interface type, a mouse device, is shown in FIG. 6. The mouse active region (i.e., the sensing elements which define the bounds of the device) must first be defined (box 50) on tactile array 1. This is done using the steps illustrated by the flowchart of FIG. 5. The mouse is then implemented by performing three distinct operations. First, an origin must be established in the mouse region. The origin establishes a position of a cursor on the screen of a display monitor. Second, click events must be detected and indicated. A click event is an input to the mouse device which indicates that a predetermined processing operation should occur. Third, the cursor on the screen of the display monitor must be repositioned in response to repositioning of the origin in the mouse region.

Having defined the mouse active region, the tactile array is sampled until a cluster is detected in the defined mouse region (box 52). Once a cluster is detected, the processor determines whether an origin has been established (box 56). If an origin has not been established, processing continues as shown in box 58. The processor samples the mouse region of the sensor array several times. The average centroid is calculated by adding the centroid x and y values to a running total, and dividing that running total by the number of samples taken. An origin is then marked. A sample counter may be used to ensure that a predetermined number of samples are taken (box 60). The number of samples taken should exceed the number required to reliably locate the origin of original contact. If the original cluster is not in the active mouse region, the running total counters are reset (box 54), the origin is not established, and the next sample is taken.

Once an origin is established as described above, the processor continues to sample the array. The processor determines for subsequent samples whether the sum of the pixel values in the cluster of each sample exceeds the "click threshold" (see box 64). The click threshold is a predetermined value over which it is assumed that a mouse "click" event has occurred. Exceeding the click threshold has the same effect as depressing the buttons of a conventional mouse. Upon occurrence of a click event, the processor executes instructions as required by a particular application on occurrence of a click event (box 66). If the sum of pixel values in a cluster does not exceed the click threshold, the processor determines whether the centroid of the cluster has been moved a predetermined distance (the "origin distance") from the centroid of the origin (box 68). If it has not, the array is sampled again. If the centroid has moved a sufficient distance, a cursor displayed on the screen of an associated display monitor (not shown) is moved to a new position prior to taking the next sample (box 70). The cursor on the display monitor is moved in the direction from the origin to the current centroid. The cursor is moved a distance equal to the product of a "velocity constant" and the distance between the origin and the current centroid. The velocity constant depends upon the sensor resolution, the resolution of the display monitor, and the sampling rate, and preferably may be changed by a user to suit the user's preference as to how fast the cursor should move. Techniques for moving the cursor in response to the new centroid are similar to techniques for moving a display cursor in response to movement of a conventional mouse. These techniques are well-known in the art.

The image interface is described with reference to FIG. 7. When processing images, a sensor array is sampled (box 72) and the gray scale pixel values (or other multi-scale values) from the array are stored as an image (i.e., each pixel having a row and column address)(box 74). The image gray scale data is then processed as required for a specific application (box 76). One such application is described with reference to FIGS. 8–10.

Figure 8:
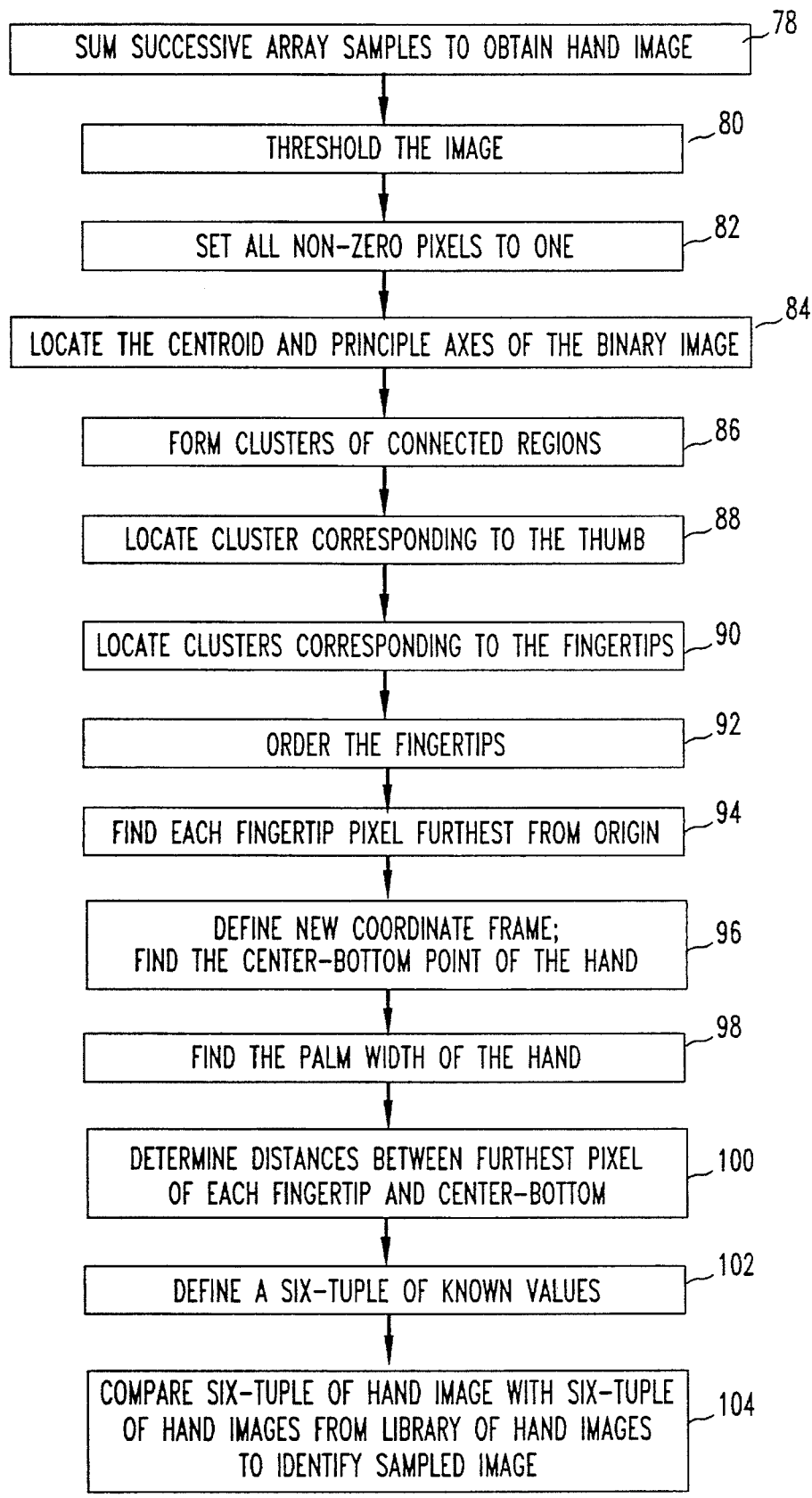
FIG. 8 is a flowchart for identifying an individual on the basis of a handprint by using an intelligent desktop surface.

FIG. 8 shows an illustrative method for identifying an individual on the basis of a handprint. This application can be used, for example, to grant or deny to an individual access to secure areas or to computer terminals. The first step in the process, shown in box 78, is to obtain successive array samples, and to sum those samples to produce a full image of a handprint. The processor typically samples the sensing array at a rate such as 50 Hz, making it desirable to sum the samples to provide a reliable image.

The image then may be thresholded (box 80) by finding the value of all non-zero pixels, and subtracting a predetermined value (e.g., 0.3 times the average pixel value) from each non-zero pixel. Following the subtraction, thresholding continues by setting any pixel having a value less than zero to zero. This process eliminates noise, and permits a person to hold a hand against the sensing array for any period of time to facilitate clustering by the processor.

Figure 9:
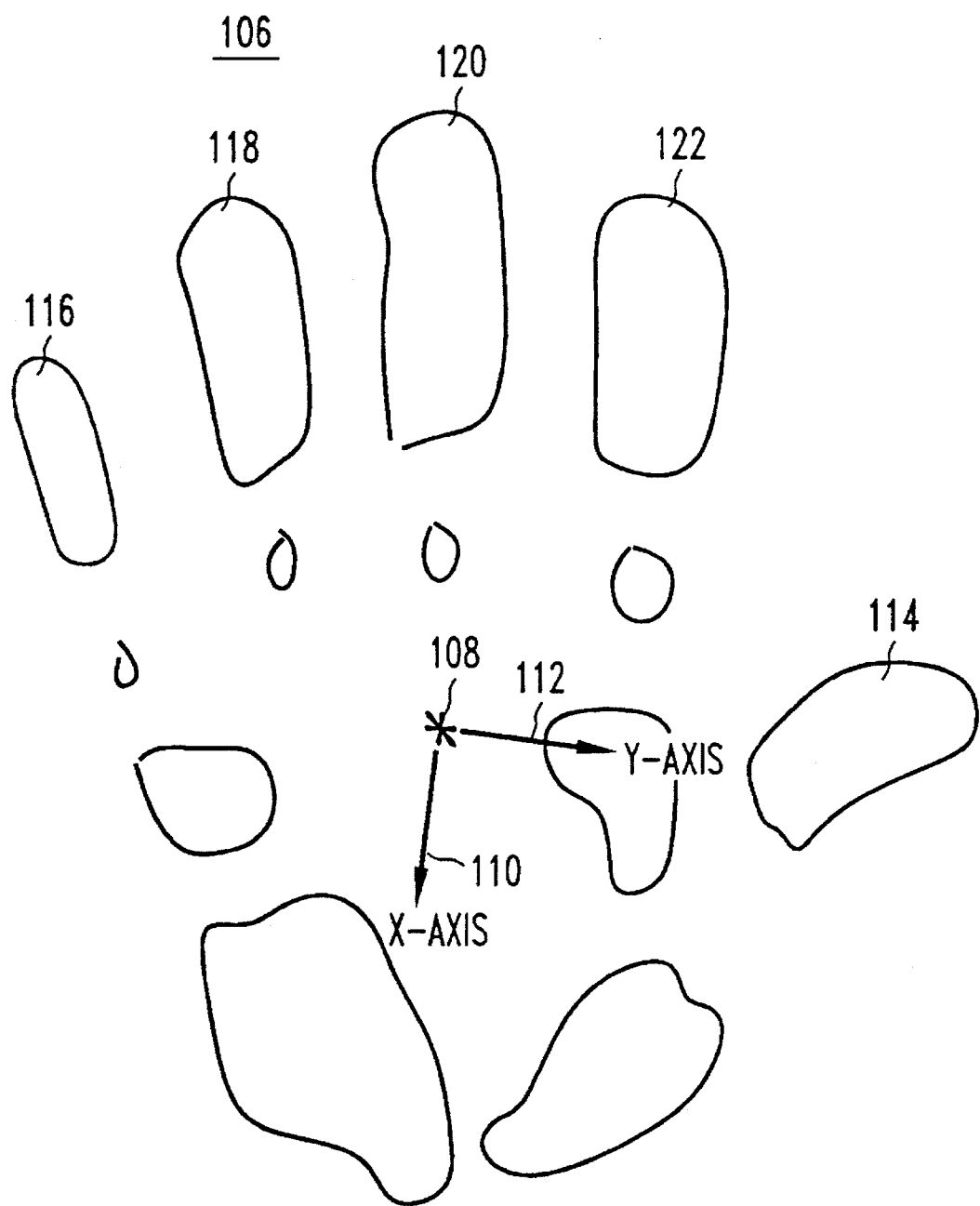
FIGS. 9 and 10 are plan views of an image of a handprint generated on the intelligent work surface.

The next step (box 82) is to convert the gray scale handprint image to a binary image. All non-zero pixels are given a value of one. This gives equal weight to each pixel, and provides a better unit of measure for subsequent operations than that available using gray scale centroid. FIG. 9 shows a handprint image 106 resulting from this process. The remaining steps of the method are described with reference to FIGS. 9 and 10.

The next step (box 84 of FIG. 8) is to locate the centroid 108 and the principle axes of binary image 106. Centroid 108 is determined using the centroid formulas described with respect to clustering above, where the value of all non-zero pixels equals one. The X-axis 110 of a quadrant frame with an origin at centroid 108 is parallel to the principle axes corresponding to the lesser principle moment, toward the heel of the palm. The Y-axis 112 is perpendicular to X-axis 110, completing a right-handed coordinate frame. This identifies the orientation of the hand.

The binary image is clustered into connected regions (box 86), and the centroid of each connected region is determined. The cluster 114 corresponding to the tip of the thumb then is located (box 88). Cluster 114 is the cluster having the centroid which is furthest from X-axis 110, and whose centroid has an x coordinate of between −1.2 and 3.5 inches.

Next, handedness is determined. If the y coordinate of the thumb centroid is positive, the handprint image is of a left hand. If the y coordinate is negative, it is the right hand.

The clusters corresponding to the fingertips then are identified and ordered (boxes 90 and 92). To do this, the processor computes the distance between centroid 108 and the centroid of each cluster that has a centroid with a negative x coordinate (excluding the thumb). The processor adds to this value the square of the x coordinate of the centroid. The four centroids with the greatest values are the fingertips. The fingertips are then ordered according to their y coordinate values, including the thumb. If the handprint is of a left hand, the thumb will have the greatest y coordinate, the index finger the next highest, followed by the middle ring and little fingers. If it is a print of a right hand, the ordering is reversed.

As shown in box 94, the processor then locates the furthest pixel from centroid 108 in each of fingertip clusters 114, 116, 118, 120, and 122.

Figure 10:
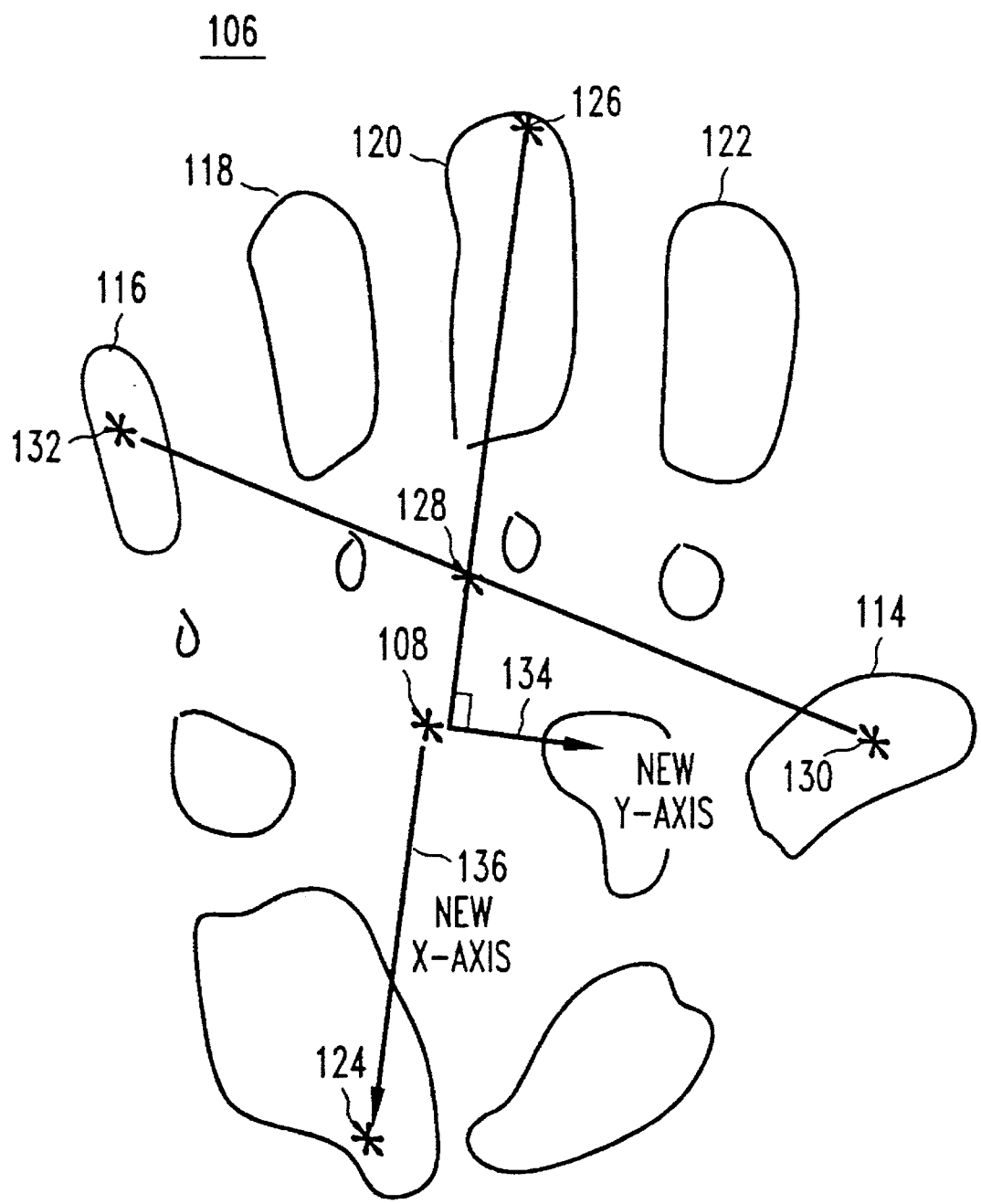

Next, the center-bottom point 124 of the palm of the hand is located (box 96). To do this, a new coordinate frame, shown in FIG. 10, is defined. The new coordinate frame is based at the same origin as the original coordinate frame. The new X-axis 136 is defined to be parallel to a line connecting the furthest pixel away from the centroid 126 of the middle finger cluster 120 and the midpoint 128 of a line segment drawn between the centroid 130 of thumb cluster 114 to the centroid 132 of little finger cluster 116. The new Y-axis 134 completes a right-handed coordinate frame. Using this coordinate frame, the x coordinate of bottom-center point 124 is the x coordinate of the non-zero pixel with the greatest x value in the new coordinate frame. The y coordinate is determined by finding the two non-zero pixels, with an x coordinate greater than zero, that have the greatest and smallest y coordinates, respectively (excluding pixels in thumb cluster 114). The average of these two y coordinates is the y coordinate of center-bottom point 124.

The processor then determines the palm width of the hand (box 98). The palm width is defined to be the absolute distance between the two extreme y values, excluding clusters identified as fingers. The processor also determines the distances between the center-bottom of the hand 124 and the furthest pixel of each fingertip (box 100).

A six-tuple is used to characterize an individual's handprint (see box 102). The six values that form the six-tuple are the distances from bottom-center point 124 to the furthest pixel in each fingertip, and the palm width. This six-tuple can be compared to a library of six-tuples which define a library of handprints (box 104). Thus, a handprint from an unknown individual can be identified by calculating the six-tuple defined as $<d_1, \ldots, d_6>$, and comparing it to the six-tuples previously stored for known individuals (defined as $<c_{x1}, \ldots, c_{x6}>$). A comparison is made by computing the euclidean distance between tuples for each known individual according to the formula:

$$D_x = \left( \sum_{i=1}^{6} (C_{x,i} - d_i)^2 \right)^{1/2}$$

The unknown handprint is identified as belonging to the known individual with the lowest $D_x$ value.

The flowcharts of FIGS. 11 and 12 illustrate methods for implementing in processor 2 various intelligent floor applications.

FIG. 11 flowcharts a method for recognizing and controlling a motorized vehicle operating on a surface (such as a floor) that is covered with sensor arrays. The vehicle is identified and its position is determined. The vehicle is then driven to a desired location under feedback control. Collisions between the vehicle and other objects are avoided using a priority determining procedure.

The first step in controlling a motorized vehicle is to sample the floor sensor array, as shown in box 140. The process then identifies the vehicle by its known footprint (box 142). To do this, the processor performs cluster analysis as described above, determines the centroids of the detected clusters and any distances between the centroids, and compares this information to the known footprint of the vehicle. The processor then determines the location of the vehicle on the floor (box 144), and compares the location of the vehicle to the desired location. The vehicle's previous location, once available, can be used to limit the search for the vehicle's current location. The motor and steering units of the vehicle are then actuated (as required for the type of vehicle being operated) to drive the vehicle toward the desired location. The processor repeatedly samples the sensing arrays on the floor and adjusts the motor and steering units (box 146) until the vehicle arrives at the desired location.

The processor preferably provides a means for avoiding collisions with obstacles, such as other vehicles or people (see box 141). In one embodiment, if the vehicle comes within a predetermined distance of another vehicle (or an object), the relative priorities of the two vehicles are determined (box 143). The vehicle having the higher priority is driven to the desired location (box 145). The lower-priority vehicle remains stopped until the higher-priority vehicle has moved out of range (box 147), and then continues toward the desired location. Vehicles typically are given higher priority than stationary objects, yet lower priority than people. The direction and speed of the vehicle can be modified as required to avoid obstacles and depending on traffic patterns on the floor.

FIG. 12 flowcharts a method for identifying an individual on the basis of footprint analysis. The first element of the footprint analysis is to sample the array as shown in box 148. The footstep must be sampled at a constant rate so that a template of the footstep, comprising a series of footprint images, may be constructed. Once constructed, the template describing the "unknown" (i.e., as yet unidentified) footstep is compared to a library of templates of "known" footsteps, so that the unknown footstep may be identified.

The processor computes the "origin" of the footstep (box 150) preferably by defining the first frame (the first footprint image of the footstep) as the sensor array sample that detects the heel of the footstep contacting the floor. The centroids of this first footprint image and a second footprint image are computed and averaged. This average centroid defines the origin.

For each succeeding footprint image, until the toe lifts off the floor at the end of the footstep, the processor samples the sensing array, and computes and stores the centroid of the footprint image (boxes 152, 154, and 156). The processor also computes and stores the distance from the centroid of each footprint image to the origin (box 158), and the sum of all pixel values (box 160). The sum of all pixel values is proportional to the weight applied to the array. Once all footprint samples have been taken (i.e., the foot no longer contacts the floor), the processor reinterpolates the data (box 162).

Figure 13:
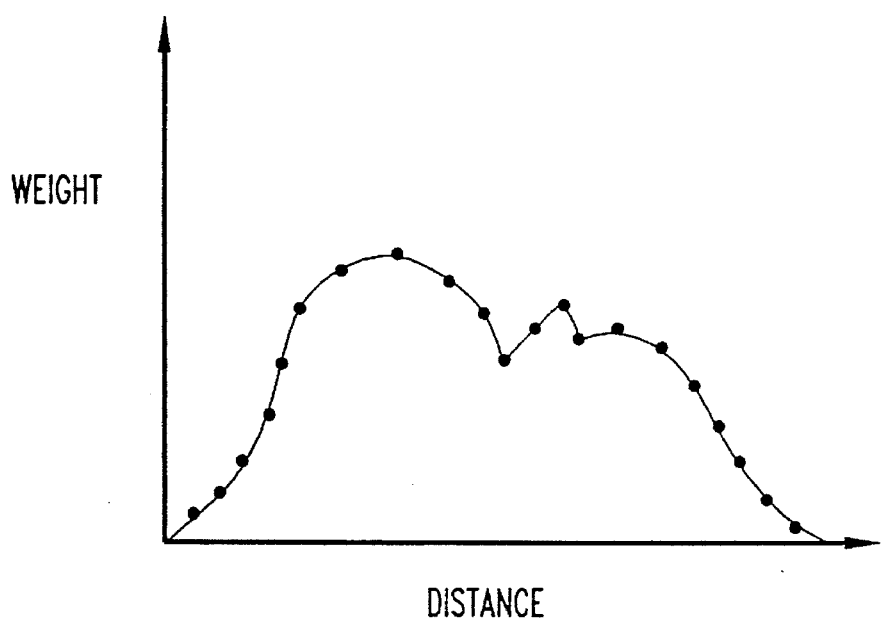
FIG. 13 is a graph of data from successive footprint image samples.

If the processor took N samples (i.e., N footprint images) during a footstep, there will be N−2 computed distances and pixel sums (i.e., weights). As shown in FIG. 13, this method focuses on the relationship between distance versus weight. The graph of FIG. 13 is derived from the weight versus time and distance versus time information collected through the series of array samples taken from the time the heel of the foot contacts the sensor array to the time the toe is lifted from the sensor. To obtain data which is evenly spaced on the abscissa, the data is reinterpolated, preferably at intervals of 15/128 distance units. This results in 128 data points between 0 to 15 distance units (i.e., inches). (The number 15 is chosen here because the largest expected footprint will not exceed 15 inches in length.) These 128 data points (some of which may be zero) define a 128-tuple $<d_1, \ldots, d_{128}>$, which characterizes the unknown footstep (see box 164 of FIG. 12). The 128-tuple of the unknown footstep may be compared with the 128-tuple of known footsteps ($<C_{x1}, \ldots, C_{x128}>$, for individual "x") from a library of footsteps (box 166 of FIG. 12). The footsteps may be compared using an Euclidean distance measure:

$$D_x = \left( \sum_{i=1}^{128} (d_i - C_{x,i})^2 \right)^{1/2}$$

The unknown footstep (and the unknown individual to whom the footstep belongs) is identified as the footstep (and individual) having the smallest $D_x$ value.

Referring again to FIG. 4, details of illustrative circuitry for implementing the intelligent work surfaces will now be described. Sensor arrays 12 preferably cover a work surface without significantly altering height or profile of the surface. Each of sensor arrays 12 typically may be a piezoresistive tactile sensor array, such as a polymer ink array. Sensor arrays 12 have separately addressable sensing elements, which typically comprise intersections of rows and columns of conductive elements. Thus, array 12 may be "sampled" by sequentially addressing the columns and rows. Sensor arrays suitable for use as array 12 are commercially available from Interlink Electronics, Carpinteria, Calif. 93013. Of course, one skilled in the art will appreciate that many other types of sensors, such as variable capacitance sensors, may be used to implement sensor array 12, without departing from the scope or spirit of the invention.

Addressing circuitry 14 typically may include circuitry for isolating each sensing element in array 12, to prevent undesirable current flow through parallel paths in the array. Circuitry for implementing addressing circuitry 14 is described in commonly owned, U.S. patent application Ser. No. 07/775,881, filed on Oct. 11, 1991, which is hereby incorporated by reference herein in its entirety. A/D converter 16 may be implemented using any commercially-available A/D converter circuit.

Addressing circuitry 14, A/D converter 16, and buffer 18 are controlled via control lines 22. Control signals are broadcast over lines 22 to all sensor arrays 12 simultaneously, and data is sequenced onto common data bus 20 via buffers 18. A strobe signal times the conversion of the analog output from sensor array 12 (through addressing circuitry 14) by A/D converter 16.

Any number of sensor arrays 12 (up to the limits of the sensor select code) can be accessed at the same rate as a single array, provided the time required to select an array and output the data from the array to bus 20 is less than the settling period. If more than $2^8$ sensor arrays 12 are required, the data bus can be enlarged to accommodate additional sensors.

The primary parameters to be determined in an intelligent work surface application are sensing element density and array sampling frequency. These parameters are controlled largely by the application. For example, intelligent desktops generally require greater sensing element density than intelligent floors.

Assuming a 32 microsecond settling period, an 800 nsec strobe (with data ready at the output 800 nsec after the strobe, as is typical of commercially available A/D converters) and a 1 microsecond addressing period, a sensing element of the array can be addressed and sampled, on average, every 33.8 microseconds. Thus, an array of 16×16 sensors (each array having 256 sensing elements), can generate data at a rate of 7.54 megapixels/second. This data rate is similar to that of a standard 512×480 pixel video image, which generates 7.37 megapixels/second when updated at 30 Hz.

To implement typical modular input devices, such as a keyboard or mouse, sensing element densities of 0.125 to 0.25 in$^2$ typically are adequate. At this resolution, an intelligent desktop generates data at rates from 1.2 to 4.9 megapixels/sec. This is within an order of magnitude of video images at 30 Hz.

An area of 12' by 12' is typical for an office or small common equipment area in an office building. In an area of this size, with sensing element densities ranging from 1.5 in$^2$ down to 0.25 in$^2$, data can be generated at a rate of 0.27 Mpixels/sec to 9.78 Mpixels/sec. In the midrange, using a sensor density of ¾ in$^2$, an intelligent floor generates data at 1.10 Mpixels/sec, approximately fifteen percent of that generated by a single video camera. However, these data rates can be altered substantially by increasing the sampling rate to 115 Hz, or by decreasing the array resolution as described, for example, in U.S. patent application Ser. No. 07/775,881, discussed above.

It will be understood that the foregoing is merely illustrative of the principles of the invention, and that various modifications can be made by those skilled in the an without departing from the scope and spirit of the invention. For example, the sensor arrays of the present invention could be applied to wall surfaces, and used interactively and in conjunction with projected information from a computer display. An individual could respond to projected information by contacting the "intelligent wall surface," to provide input to a computer. The scope of this invention is limited only by the claims that follow.

I claim:

1. A method for identifying a person, comprising the steps of:

sampling a tactile sensor array to record a force-image of a handprint that is characteristic of the person, tactile sensor array comprising a plurality of sensing elements;

determining from the recorded force-image information characteristic of the person;

comparing the information characteristic of the person with information characteristic of known individuals; and identifying the person as one of the known individuals on the basis of the comparing step, wherein the determining step comprises:

defining an origin at a centroid of the force-image;

determining a set of principle axes of the force-image;

performing connected region analysis on the force-image to separate the force-image into a plurality of connected regions;

identifying the connected regions corresponding to fingertips of the force-image;

identifying a pixel of each fingertip that is spaced furthest from the origin;

calculating the distances between a predetermined point on the force-image and the pixel of each fingertip that is spaced furthest from the origin; and calculating the width of the palm of the force-image.

2. The method of claim 1, wherein the sampling step comprises:

summing pixels output from successive samples of the sensor array to produce the force-image;

subtracting a predetermined value from each non-zero pixel;

setting to zero all pixels having a value less than zero; and setting to one all non-zero pixels.

3. A method for identifying a person, comprising the steps of:

sampling a tactile sensor array to record a force-image that is characteristic of the person;

determining from the recorded force-image information characteristic of the person;

comparing the information characteristic of the person with information characteristic of known individuals; and identifying the person as one of the known individuals on the basis of the comparing step, wherein the determining step comprises:

defining an origin at a centroid of the first force-image of the series of sequential force-images;

calculating for each succeeding force-image: a centroid of the force-image, the distance between the centroid of the force-image and the origin, and a sum of all pixel values of the force-image; and correlating for each force-image the sum and the distance between the centroid of the force-image and the origin, to characterize the person.

4. The method of claim 3, further comprising the step of reinterpolating the sum and the distance to obtain data values at predetermined intervals for characterizing the person.

* * * * *